(12) United States Patent  (10) Patent No.: US 8,786,423 B2
Miller et al.  (45) Date of Patent: *Jul. 22, 2014

(54) PROGRAMMABLE CONTROL FOR SIREN AND LIGHTS

(75) Inventors: Daniel S. Miller, St. Louis, MO (US); Roger L. Miller, Louisville, KY (US); Daniel S. Pursley, St. Peters, MO (US); John C. Davis, Eureka, MO (US)

(73) Assignee: Code 3, Inc., St. Louis, MO (US)

( * ) Notice: Subject to any disclaimer, the term of this patent is extended or adjusted under 35 U.S.C. 154(b) by 94 days.

This patent is subject to a terminal disclaimer.

(21) Appl. No.: 13/478,753

(22) Filed: May 23, 2012

(65) Prior Publication Data

US 2013/0038444 A1  Feb. 14, 2013

Related U.S. Application Data

(60) Provisional application No. 61/489,581, filed on May 24, 2011.

(51) Int. Cl.
 *B60Q 1/52* (2006.01)
(52) U.S. Cl.
 USPC .......................................... 340/472; 340/474
(58) Field of Classification Search
 USPC ........ 340/3.1, 3.22–3.24, 3.42–3.44, 3.7–3.8, 340/3.71, 7.5, 384.4, 438, 455, 471–472, 340/474, 815.52
 See application file for complete search history.

(56) References Cited

U.S. PATENT DOCUMENTS

| 4,065,767 | A |  | 12/1977 | Neuhof et al. |
| D254,603 | S |  | 4/1980 | Gosswiller |
| D254,604 | S |  | 4/1980 | Gosswiller |
| 4,209,769 | A | * | 6/1980 | Chronerberry ............... 340/902 |
| 4,232,390 | A |  | 11/1980 | McEvilly, Jr. |
| 4,363,028 | A |  | 12/1982 | Bosnak |
| D273,470 | S |  | 4/1984 | Olson |
| 4,529,969 | A |  | 7/1985 | Gosswiller |
| 4,554,533 | A | * | 11/1985 | Bosnak ........................ 340/514 |
| 4,633,229 | A |  | 12/1986 | Iacono et al. |
| 4,646,063 | A |  | 2/1987 | Carson |
| 4,668,938 | A |  | 5/1987 | Bosnak |
| 4,710,749 | A |  | 12/1987 | Berke et al. |
| 4,831,357 | A |  | 5/1989 | Miller |

(Continued)

FOREIGN PATENT DOCUMENTS

CA  2029168  *  7/1997  ............... G08B 7/06

OTHER PUBLICATIONS

RLS Installation and Operation Manual, 3990 Series Siren, Revision 6 (2006), 28 pages.

*Primary Examiner* — Hai Phan
*Assistant Examiner* — Orlando Bousono
(74) *Attorney, Agent, or Firm* — Senniger Powers LLP

(57) ABSTRACT

A system comprising a power supply, an emergency warning light and a speaker, in combination with a control head. One or more processors controls operation of the system in response to received user input and provides system status for display. Storage media encoded with emergency warning light system instructions for execution by one or more of the processors controls the actuation of the emergency warning light system and controls light patterns generated by the emergency warning light system. The storage media is further encoded with siren system instructions for execution by one or more of the processors for controlling the actuation of the siren system and for controlling audible sounds generated by the siren system.

26 Claims, 11 Drawing Sheets

(56) References Cited

U.S. PATENT DOCUMENTS

| | | |
|---|---|---|
| 4,847,590 A | 7/1989 | Gosswiller |
| 5,140,304 A | 8/1992 | Miller |
| 5,146,508 A | 9/1992 | Bader et al. |
| 5,241,307 A | 8/1993 | Bidault et al. |
| 5,296,840 A | 3/1994 | Gieffers |
| 5,321,388 A | 6/1994 | Biersach |
| 5,422,623 A | 6/1995 | Bader et al. |
| 5,557,257 A | 9/1996 | Gieffers |
| 5,563,576 A | 10/1996 | Drori et al. |
| 5,612,673 A | 3/1997 | Nunn |
| 5,625,257 A | 4/1997 | Nunn |
| 5,831,515 A | 11/1998 | Stewart et al. |
| 6,005,478 A | 12/1999 | Boreham et al. |
| 6,100,791 A | 8/2000 | Bader et al. |
| 6,140,934 A | 10/2000 | Lam |
| 6,211,779 B1 * | 4/2001 | Gibb et al. ............... 340/466 |
| D445,711 S | 7/2001 | Lyons |
| 6,313,733 B1 * | 11/2001 | Kyte ....................... 340/7.22 |
| D452,454 S | 12/2001 | Bekasi et al. |
| D453,306 S | 2/2002 | Bekasi |
| 6,617,967 B2 | 9/2003 | Baldwin et al. |
| 6,646,548 B2 | 11/2003 | Dornfeld |
| 6,753,763 B2 | 6/2004 | Flick |
| 6,778,078 B1 | 8/2004 | Han et al. |
| 6,856,242 B2 | 2/2005 | Trent |
| D503,644 S | 4/2005 | Case et al. |
| D505,351 S | 5/2005 | Case et al. |
| D515,558 S | 2/2006 | Case et al. |
| 7,006,902 B2 | 2/2006 | Archer et al. |
| 7,024,296 B2 | 4/2006 | Squires et al. |
| 7,040,777 B2 | 5/2006 | Yuen |
| 7,066,106 B2 | 6/2006 | Giebeler |
| 7,193,507 B2 | 3/2007 | Yu |
| 7,202,613 B2 | 4/2007 | Morgan et al. |
| 7,277,782 B2 | 10/2007 | Yakes et al. |
| 7,358,855 B1 | 4/2008 | Willis |
| D574,799 S | 8/2008 | Cronmiller et al. |
| 7,479,893 B2 | 1/2009 | Weston et al. |
| 7,486,173 B2 | 2/2009 | Fisler |
| 7,550,931 B2 | 6/2009 | Lys et al. |
| 7,551,102 B1 | 6/2009 | Carson |
| 7,791,499 B2 | 9/2010 | Mohan et al. |
| 8,193,928 B1 * | 6/2012 | Cronmiller et al. ........... 340/474 |
| 2002/0101333 A1 | 8/2002 | Lu |
| 2003/0081796 A1 | 5/2003 | Bray et al. |
| 2003/0189497 A1 | 10/2003 | Cho |
| 2003/0204777 A1 | 10/2003 | Kojori |
| 2004/0036594 A1 | 2/2004 | Ladow et al. |
| 2004/0233067 A1 | 11/2004 | Cho |
| 2005/0047134 A1 | 3/2005 | Mueller et al. |
| 2005/0134710 A1 | 6/2005 | Nomura et al. |
| 2007/0008175 A1 | 1/2007 | Johnson et al. |
| 2007/0016452 A1 | 1/2007 | Wilson, III |
| 2007/0146127 A1 | 6/2007 | Stilp et al. |
| 2009/0045754 A1 | 2/2009 | Jozwik |
| 2009/0115594 A1 | 5/2009 | Han |
| 2010/0097817 A1 | 4/2010 | Nagara et al. |
| 2010/0125393 A1 | 5/2010 | Jarvinen et al. |

* cited by examiner

PROGRAMMABLE CONTROL FOR SIREN AND LIGHTS

BACKGROUND

The technology described in this patent document generally relates to a system for controlling sirens and warning lights in a motorized vehicle and, in particular, to a programmable control system for a siren and warning lights in a motorized vehicle.

SUMMARY

Systems and methods are described herein for controlling a siren and warning light system in a motorized vehicle. In one example, a system is provided for use with a power supply of a vehicle, an emergency warning light and a speaker. The system includes an amplifier module, a light module and a control module. The amplifier module has an input receiving power from the power supply and has outputs for selectively energizing the emergency warning light and for selectively energizing the speaker. The amplifier module has an amplifier module processor controlling the outputs of amplifier module. The amplifier module processor has a communications port. The light module has an input receiving power from the power supply and has outputs for controlling the emergency warning light. The light module has a light module processor communicating the amplifier module and controlling the outputs of the light module. The light module processor has a communications port. A communications link connects the amplifier module communications port to the light module communications port. The control head connected to the amplifier module processor controls the amplifier module and controls the light module processor via the amplifier module processor and via the communications link.

In another example, a method is provided for use with a power supply, an emergency warning light and a speaker. The example method comprises:
providing an amplifier module having an input receiving power from the power supply and having outputs for selectively energizing the emergency warning light and for selectively energizing the speaker, the amplifier module having an amplifier module processor controlling the outputs of amplifier module, the amplifier module processor having a communications port;
providing a light module having an input receiving power from the power supply and having outputs for controlling the emergency warning light, the light module having a light module processer communicating with the amplifier module and controlling the outputs of the light module, the light module processor having a communications port;
providing a communications link connecting the amplifier module communications port to the light module communications port; and
controlling the amplifier module and controlling the light module processor via the amplifier module processor and via the communications link.

In another example, provided is a system for controlling the use of an emergency warning light system and for controlling the use of a siren system in a motorized vehicle. A user control panel receives user input and displays system status. One or more processors control operation of the system in response to received user input and provide system status for display. Storage media encoded with emergency warning light system instructions for execution by one or more of the processors controls the actuation of the emergency warning light system and controls light patterns generated by the emergency warning light system. The storage media further encoded with siren system instructions for execution by one or more of the processors controls the actuation of the siren system and controls audible sounds generated by the siren system.

In another example, a system is provided for controlling the use of an emergency warning light and for controlling the use of a siren in a motorized vehicle. A user control panel receives user input and displays system status. One or more processors controls operation of the system in response to received user input and provides system status for display. Storage media encoded with system instructions for execution by one or more of the processors controls the actuation of and the pattern provided through the emergency warning light and controls the actuation of and the audible sounds generated by the siren. Alternatively or in addition, the system may have one or more of the following:

wherein when a push-to-talk (PTT) function is activated for providing audio via a speaker, one or more of the processors resets the PTT function after a preset period of being activated so that the reset returns the system to its previous condition even though the PTT function continues to be active thereby avoiding a system operation in which the PTT function is activated beyond the preset period;

one or more of the processors is programmed to implement a configurable power manager function or a configurable load manager function;

one or more of the processors is programmed to implement monitoring voltages or currents of components and includes de-energizing a component having a monitored voltage or a monitored current outside a preset range;

one or more of the processors is programmed to implement monitoring current or voltage of the power supply and includes dropout voltage groups wherein a user selects one or more groups of outputs of the system to de-energize when the power supply levels fall below a specified voltage level for each selected group; and/or wherein one or more of the processors implements a load manager function and a configurable delayed shutoff function wherein the load manager when configured controls the power to other equipment in the vehicle through an external solenoid and wherein the configurable delayed shutoff function when configured includes a sleep delay timer such that the system remains active after the vehicle ignition is turned off for the duration of the sleep delay timer.

BRIEF DESCRIPTION OF THE DRAWINGS AND APPENDICES

Figure 1:
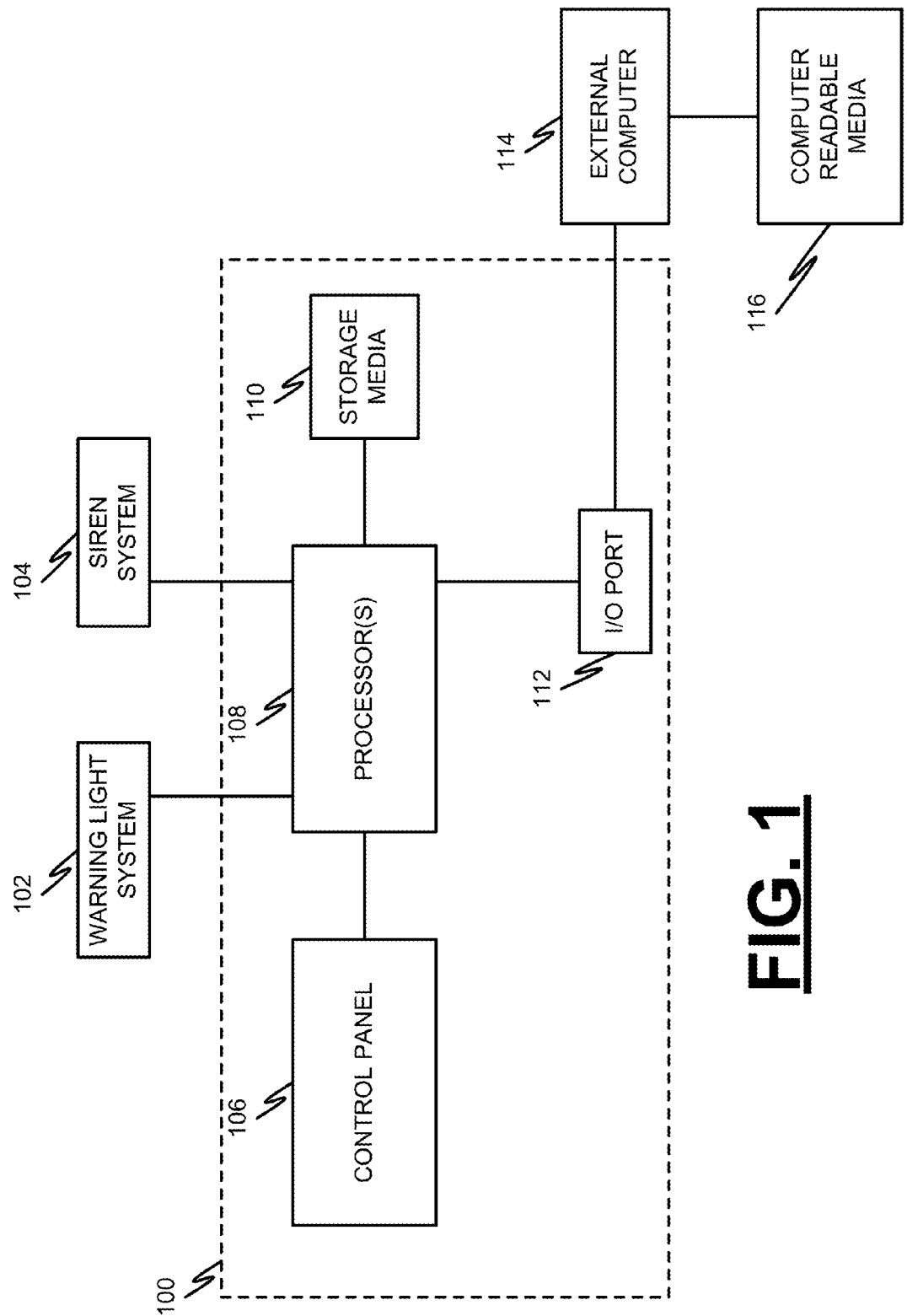
FIG. 1 is a block diagram of another example system for controlling the actuation of a warning light system and siren in a motorized vehicle.

APPENDIX 1 illustrates FUNCTIONS CONTROLLED BY AMPLIFIER MODULE processor of an example system.

APPENDIX 2 illustrates FUNCTIONS CONTROLLED BY CONTROL HEAD MODULE PROCESSOR of an example system.

APPENDIX 3 illustrates FUNCTIONS CONTROLLED BY LIGHT MODULE PROCESSOR of an example system.

APPENDIX 4 illustrates Siren System Platform Z3™ Siren System Technical Specification of an example system.

APPENDIX 5 illustrates a Hardware Installation and Operation Manual of an example system.

APPENDIX 6 illustrates a Hardware Quick Install Manual of an example system.

APPENDIX 7 illustrates a Quick Start Software Configuration Setup Manual of an example system.

APPENDIX 8 illustrates a Software User Manual of an example system.

Corresponding reference characters indicate corresponding parts throughout the drawings.

DETAILED DESCRIPTION

FIGS. 1A-1D are example screen shots of displays presented by software for configuring an amplifier module. Many parameters of the example system may be specified by the user, some of which have limited ranges, minimums and/or maximums. Example settings and their purpose are discussed below and within the Appendices.

FIG. 1 is a block diagram of an example system 100 for controlling the actuation of a warning light system 102 and siren system 104 in a motorized vehicle such as an emergency vehicle. The example system 100 includes a control panel 106, one or more processors 108, storage media 110, and an input/output (I/O) port 112, such as a USB or other port. The control panel 106 may be used to receive user input, for example via push buttons, switches, touchpad, etc., and may be used to display system status.

The processor(s) 108 execute programming instructions stored on storage media 110 to control the operation of the system, such as the actuation of the warning light system and the light patterns generated by the warning light system, in response to received user input and to provide system status for display by the control panel 106. The processor(s) 108 also execute other programming instructions stored on storage media 110 to control other operations of the system, such as executing programming instructions for controlling the actuation of the siren system and for controlling audible sounds generated by the siren system.

Figure 1A:
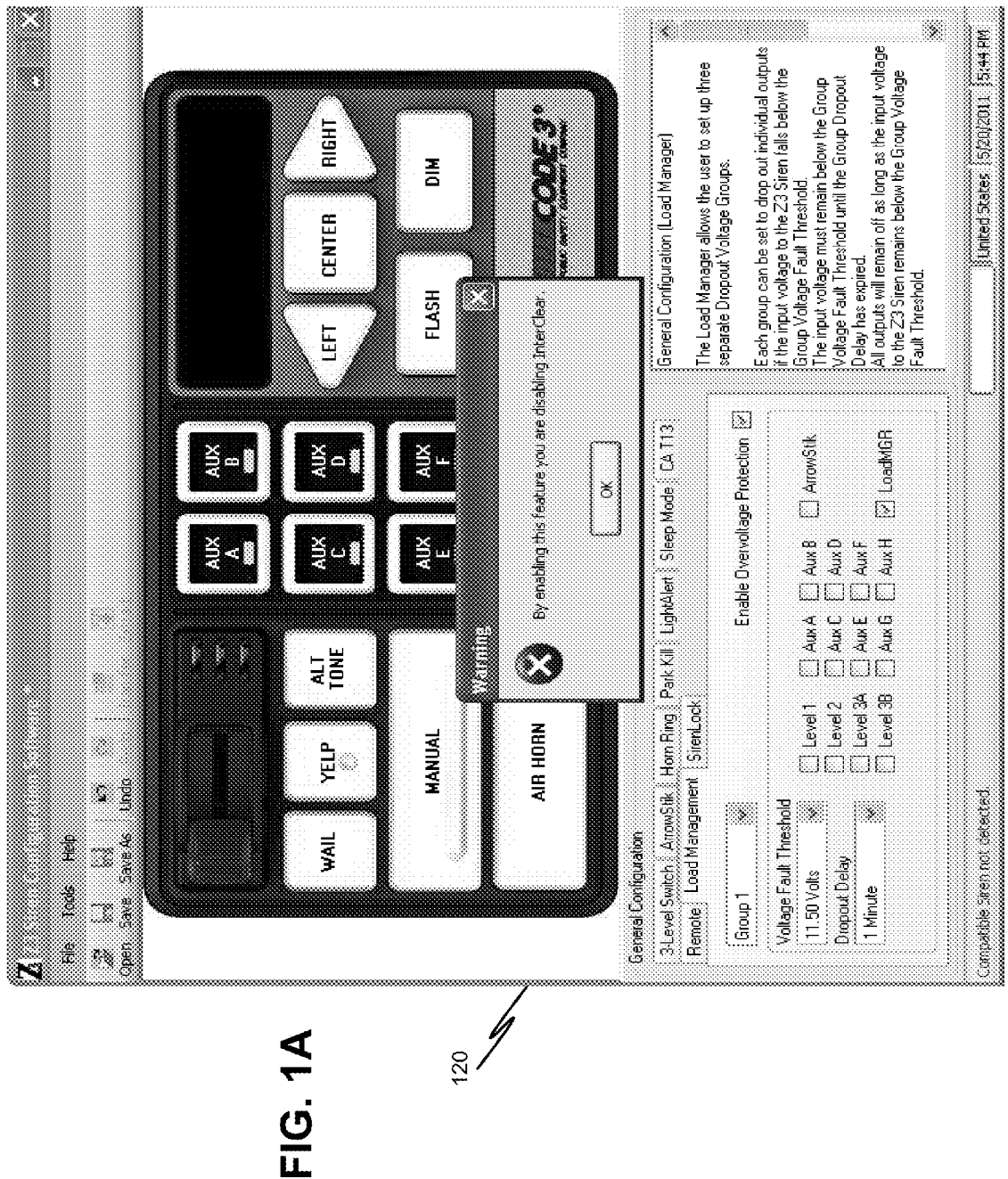
FIGS. 1A-1D are example screen shots of the control panel for configuring an example amplifier module.
Figure 1B:
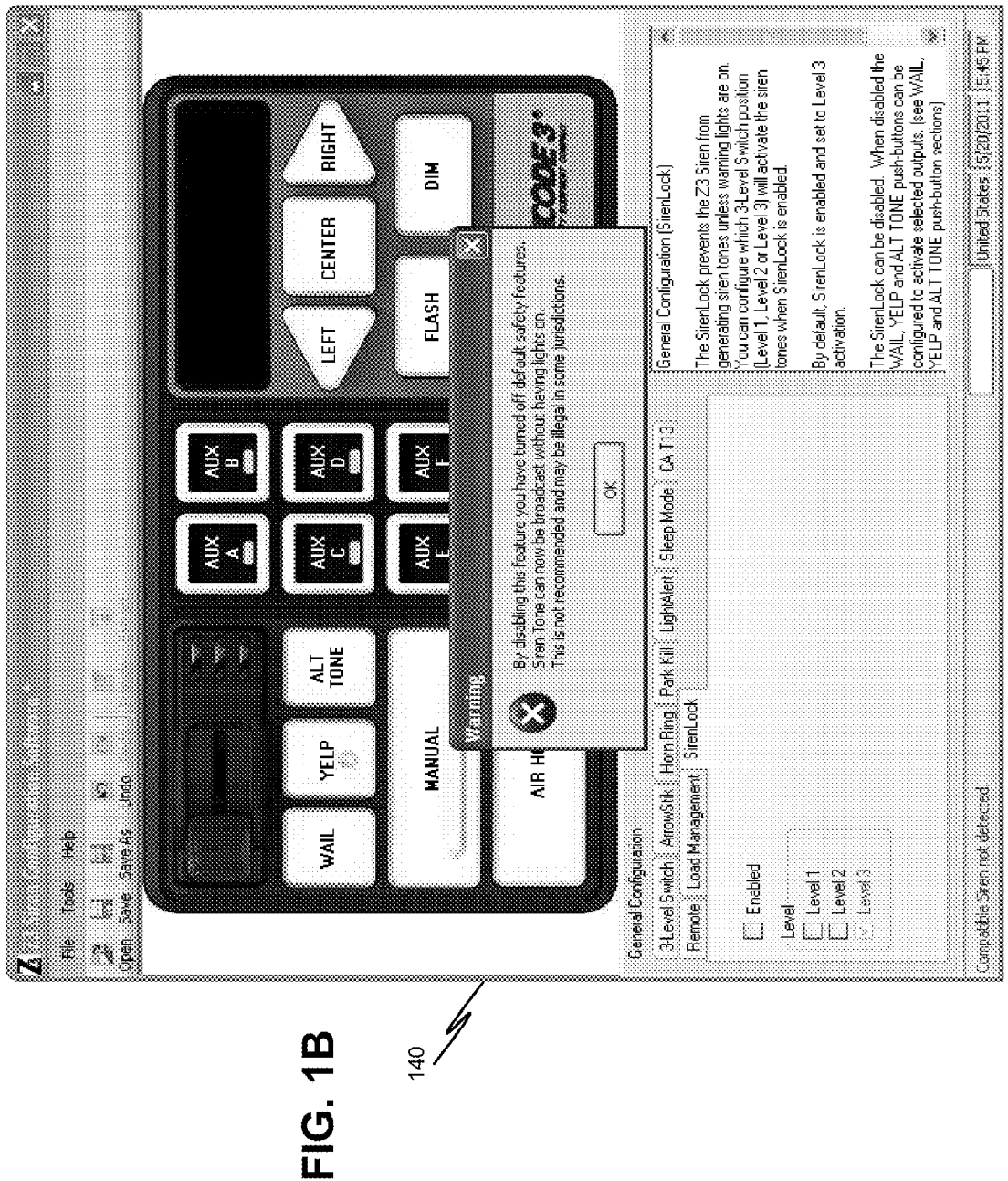
Figure 1C:
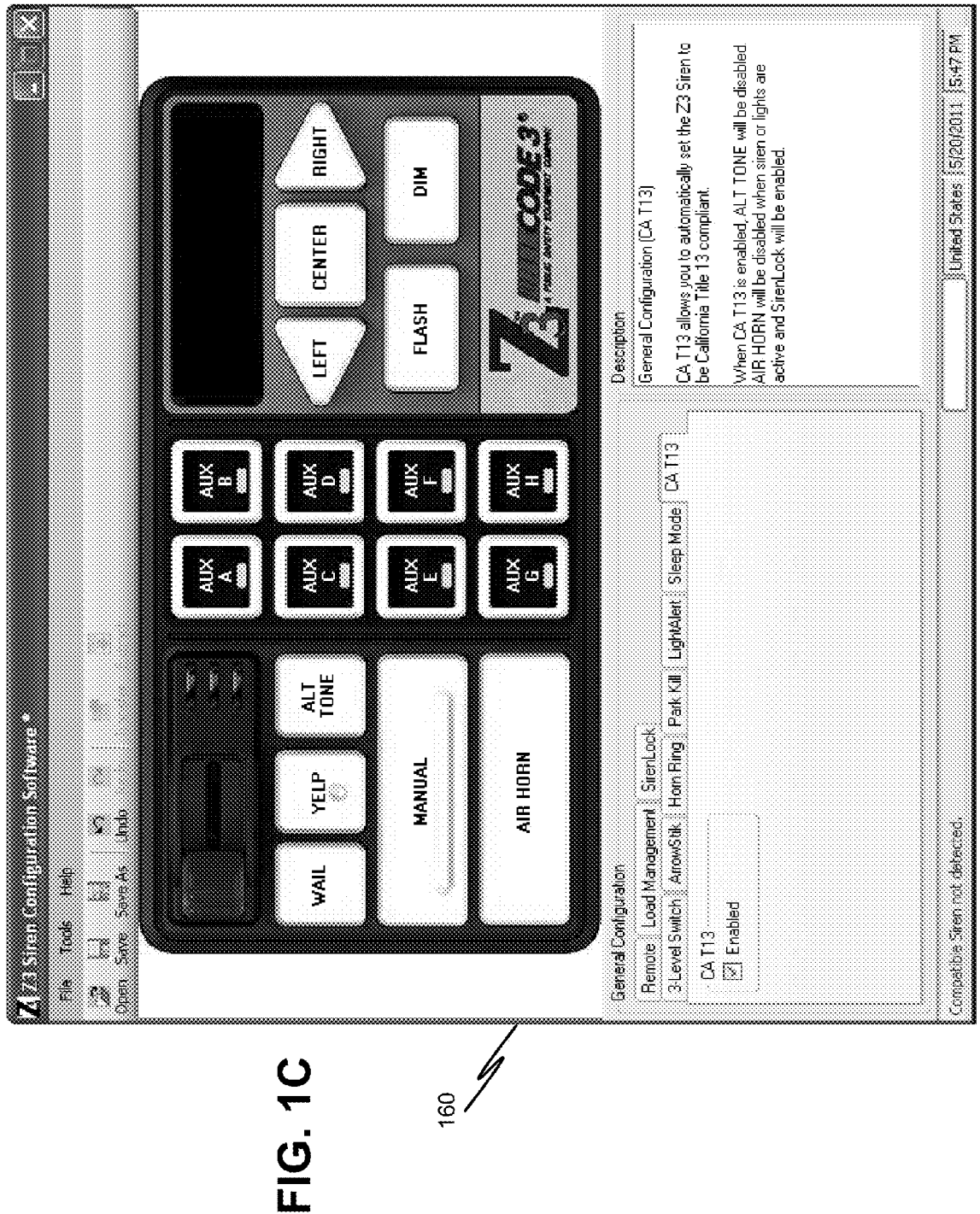
Figure 1D:
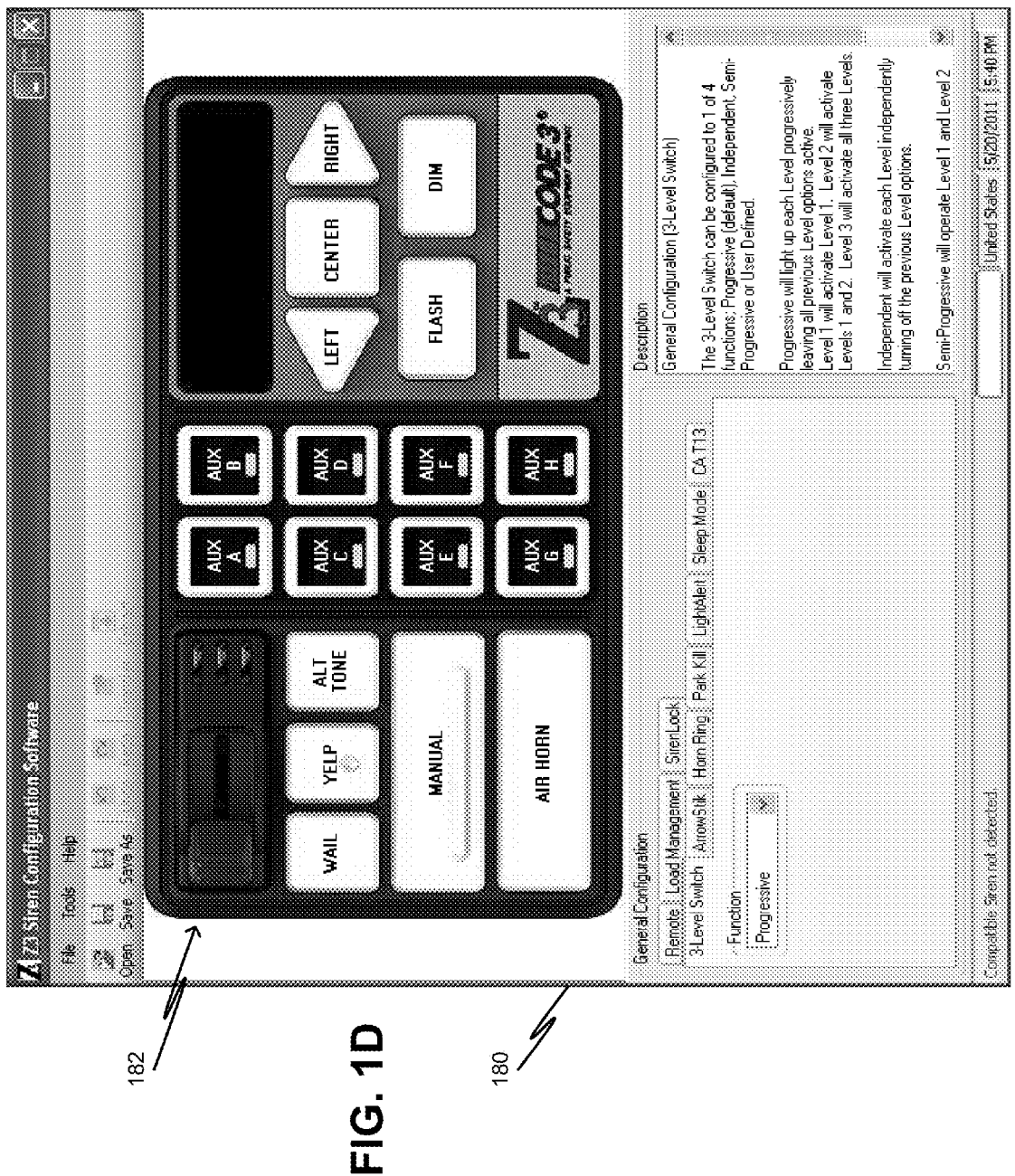

The I/O port 112 may be used by an external computer 114 to pass instructions or data to the processor (s) 108 and/or storage media 110 that may be stored in the storage media 110. Data and/or instructions passed by the external computer 114 may be used by the processor (s) 108 to configure the system 100. The instructions may include monitoring instructions for detecting a system, setting which is outside a reference range, above a maximum and/or below a minimum. Among other features, the monitoring instructions may control the system and/or provide a warning to the user when a system setting is outside the reference range. For example, FIG. 1A illustrates a screen 120 which allows a user to select the load management settings, such as under-voltage and over-voltage thresholds, among other setting discussed herein. FIG. 1B illustrates a screen 140 which allows a user to select the siren lock settings, among other setting discussed herein. FIG. 1C illustrates a screen 160 which allows a user to select the California Title 13 settings (CAT 13), among other setting discussed herein. FIG. 1B illustrates a screen 180 which allows a user to select function settings for a 3-level toggle switch 182 (see also 202 of FIG. 2), among other setting discussed herein.

The storage media 110 may also be encoded with operating options instructions that when executed by one or more of the processors 108 causes the system 100 to receive operating options data over the I/O port 112. The operating options data, when interpreted by one of the processors 108 executing the operating options instructions, causes the system to make available for user selection via the user control panel 106 (e.g., a control head module 700) a subset of available system operating options. The subset of system operating options corresponds to the operating options data.

Tangible computer readable media 116 encoded with computer executable configurable instructions may also be provided for use with the external computer. The user-configurable instructions when executed by the external computer 114 may allow the external computer to provide monitoring instructions to the processor (s) via the I/O port 112. The monitoring instructions may cause the system 100 to monitor a system setting, to detect when the system setting is outside a reference range and/or to provide a warning indication via the user control panel 106 when the system setting is outside the reference range.

The storage media 110 may also be encoded with load management instructions. When the load management instructions are executed by the processor(s), the system 100 monitors system input voltage from a vehicle battery, detects when the system input voltage is outside a system input voltage reference range and/or provides a warning indication via the user control panel 106 when the system input voltage is outside the system input voltage reference range.

Figure 2:
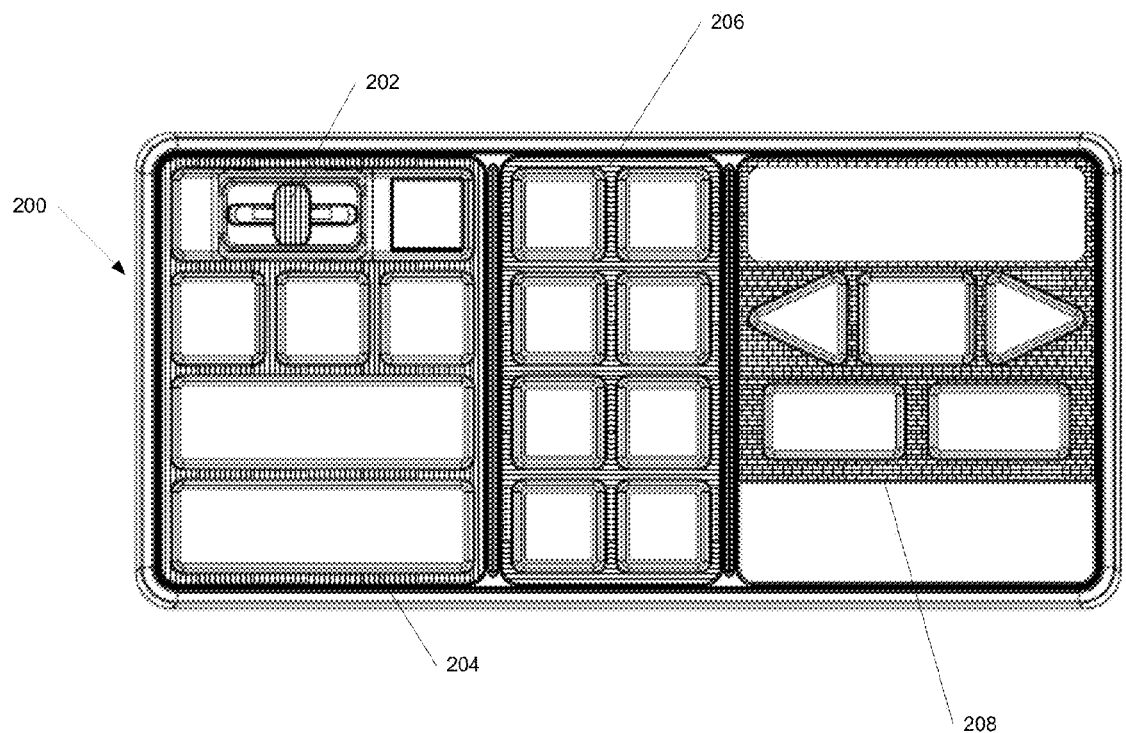
FIG. 2 is an illustration of the display of an example control head, lined for color. The toggle switch and. the left section of the faceplate of the control head are lined for the color red, the center section of the faceplate of the control head is lined for blue, and the upper right section of the faceplate of the control head is lined, for yellow (e.g., amber).

FIG. 2 is an example control head 200, lined for color. In this example, a toggle switch 202 and a left section 204 of a faceplate of the control head 200 are red to indicate to the user that the control buttons and toggle switch located in the left portion of the control head control a siren. The left section 202 is lined for the color red. A center section 206 of the faceplate of the control head 200 is blue to indicate to the user that the control buttons located in the center section 206 of the control head control the auxiliary buttons which control a light bar and/or other devices on the vehicle. The center section 206 is lined for the color blue. A right section 208 of the faceplate of the control head 200 is lined for amber (e.g., yellow) to indicate to the user that the control buttons located in the right portion of the control head control the traffic directing equipment. The right section 208 is lined for the color amber (yellow). A backlight control button for controlling dimming of a backlight for the control head 200 may also be positioned within the right section 208. It activates the DIM output on the control head. This DIM output would be connected to the light source for the control head, or other lighting equipment that has a DIM input control. This allows the user to place the backlighting of the control head 200 and/or other lighting equipment into a DIM mode of operation.

Thus, the example control head includes three control groups presented to an operator: a first control group for selectively controlling siren operation, a second control group for selectively controlling auxiliary operations, such as the emergency warning lights of a vehicle, and a third control group for selectively controlling a traffic directing light and/or emergency warning lights. The first control group includes the red toggle switch 202 and other switches having the faceplate 204 colored red. The second control group includes the switches having the faceplate 206 colored blue. The third control group has switches having the faceplate 208 colored amber (yellow).

Figure 3:
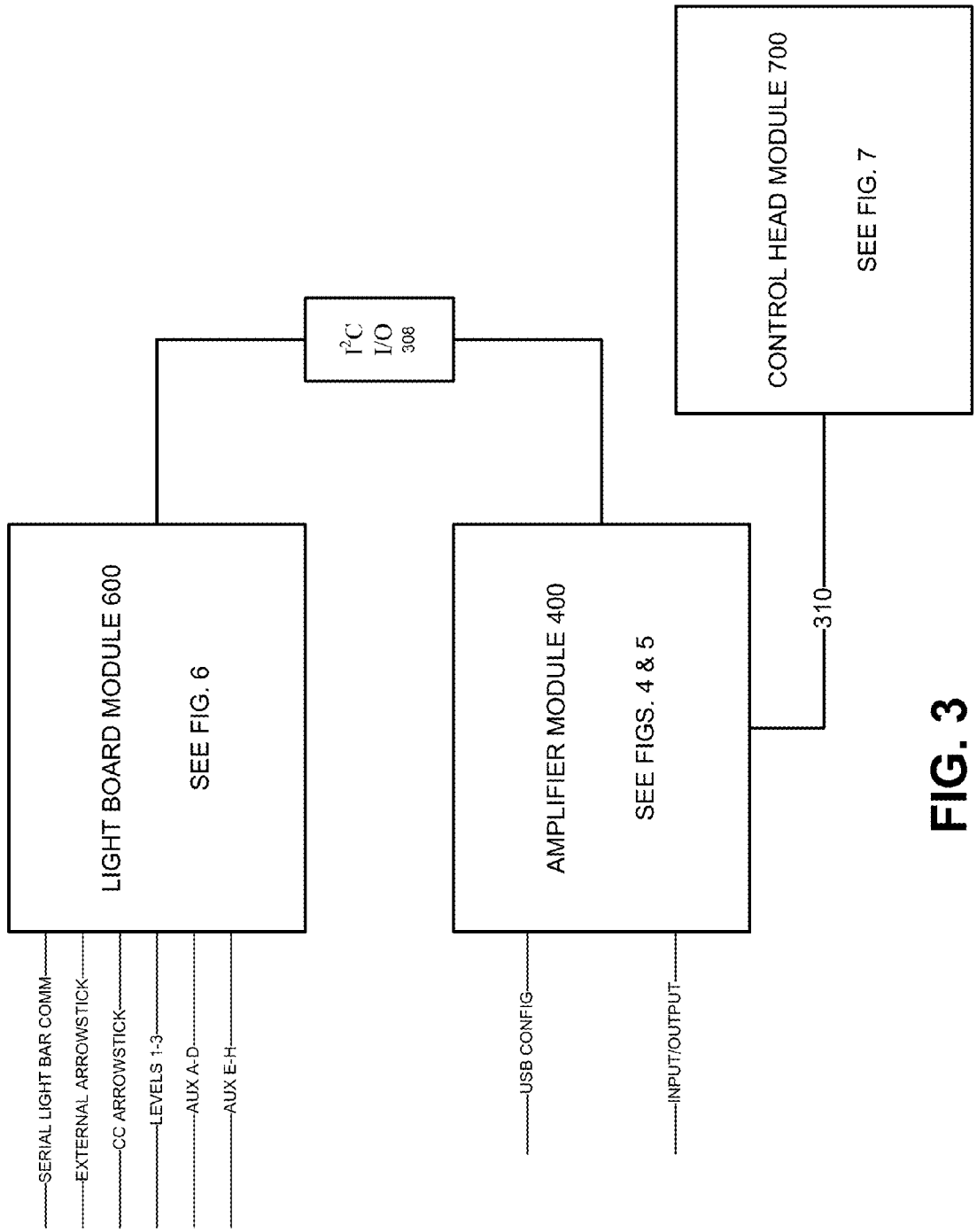
FIG. 3 is a block diagram of an example system for controlling warning lights and a siren.

FIG. 3 is a block diagram of another example system for controlling the actuation of a warning light system and siren system in a motorized vehicle such as an emergency vehicle. In general, FIG. 3 illustrates the primary connections between the modules of the example system: an amplifier module 400 primarily for driving siren speakers, a light board module 600 for primarily driving an emergency warning light or an auxiliary device and a control head module 700 for controlling the operation of the siren and other connected devices (e.g., via a CAT 5 cable 306). Both the amplifier module 400 and light bar module 600 receive power via cable connections to a battery (not shown), such as a vehicle battery. The light bar module 600 may have a dual cable connection to the battery so that three higher gauge cables instead of two lower gauge cables can handle the current needs for driving the light bar. An internal communication cable 308 interconnects processors of the modules 400, 600 to facilitate an I²C I/O (input/output) communication link between the modules 400, 600 and to facilitate communication with the control head module, which may connected to the amplifier processor 400 via a CAT-5 SAE J1708 communications cable 310.

Alternatively or in addition, some or all of the communication link between components may be direct wired or wireless, such as Wi-Fi. In one example, each module has a processor. In another example, a single processor may be used so that a communication link between the modules and/or processors is not needed. In yet another example, one or more processors control operation of the system in response to received user input and provide system status for display. The processors may be independent of each other so that a communications link between processors is not needed. In general, a link or cable 308 between storage media encoded with system instructions for execution by one or more of the processors controls the actuation of and the pattern provided through the emergency warning light and controls the actuation of and the audible sounds generated by the siren. For convenience, the following description of FIGS. 4-7 includes the example wherein each module has a processor. The examples shown in FIGS. 4-7 may be modified to include one or more processors. Also, FIGS. 4-7 show one example implementation of the various functions, inputs and outputs of the modules and the processors. Other example implementations may provide for any one or more of the processors to provide any one or more of the functions illustrated and any one or more of the processors may have any one or more of the inputs and/or outputs instead of or in addition to the other processors. Also, the example system of FIG. 1 may perform any one or more of the functions illustrated with regard to FIGS. 4-7 and may have any one or more of the inputs and/or outputs illustrated in FIGS. 4-7.

Figure 4:
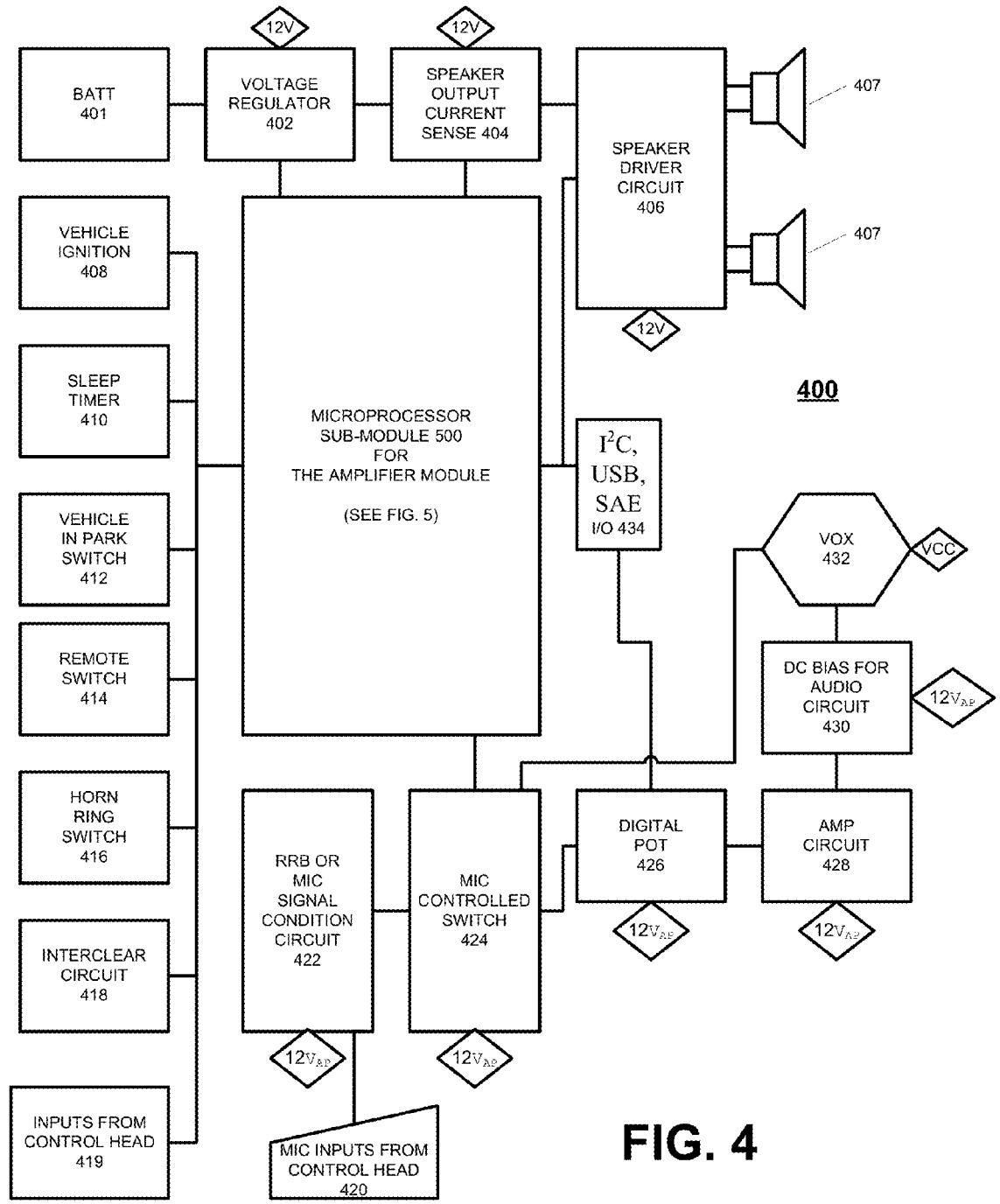
FIG. 4 is a block diagram of an example amplifier module.

FIG. 4 is a block diagram of some of the various inputs and outputs of an example amplifier module 400. The module 400 is connected to a vehicle battery 401 (or other battery) via a voltage regulator 402 and also via a circuit 404 for sensing current (and/or voltage) supplied by the battery 401 to a speaker driver circuit 406 driving one or more speakers 407. An ignition input port 408 monitors the on/off condition of the vehicle ignition. A software timer 410 in the amplifier processor (see 502 in FIG. 5) is referred to as a sleep timer. This sleep timer may be configured using the siren configuration software. In one example, it may be set for instant off or for a 10 minute, 20 minute, 30 minute, one hour, two hour, or four hour delay. This delay is started when the processor 502 detects that the vehicle ignition is turned off through the ignition input 408. The sleep timer maintains power to the amplifier, the control head and the light board until the delay expires.

A park switch input 412 monitors the status of the vehicle park switch. An additional remote switch I/O port 414 may be to connect to an independent control switch such as a foot switch (not shown). The amplifier module 400 is programmed to execute a particular mode when receiving the appropriate signal via the remote switch input port 414. For example, when the foot switch is activated while the amplifier is generating one of the primary tones, the amplifier would execute a particular mode, such as change the amplifier tone from the primary tone to an override tone for approximately 7 to 8 seconds. It may also activate an InterClear output based on the configuration settings. As used herein, Interclear is a user-actuated timed-circuit option that initially changes the tones of the siren and the pattern of the light signals as the vehicle approaches an intersection, and then returns the siren to normal operation after a pre-set interval.

A horn ring I/O 416 monitors the status of a horn ring switch (not shown). The amplifier module 400 is programmed to execute a particular mode when receiving the appropriate signal via the horn ring I/O 416. For example, when the horn ring is activated while the amplifier is generating one of the primary tones, the amplifier would execute a particular mode, such as change the amplifier tone from the primary tone to an override tone for approximately 7 to 8 seconds. It may also activate the InterClear output based on the configuration settings. An InterClear output 418 connects to an InterClear circuit which connects to the device or circuit that activate an InterClear Feature. The operation during the InterClear mode is preprogrammed by the user. InterClear may be activated in different ways. For example, if the siren is operating one of the three primary tones (wail, yelp, alt tone) and the horn ring is configured for Hit-n-Go, the InterClear feature turns on when the vehicle horn ring is pressed and remains on for approximately 7 to 8 seconds. The siren also generates one of the secondary tones as configured. In one embodiment, a manual button can also turn on the InterClear output while it is pressed. The InterClear output can also be configured to operate as the LoadMGR output. This feature disables the normal InterClear function and utilizes the same circuitry to provide a positive signal. This signal may be connected to a user supplied solenoid, or relay to power other equipment within the vehicle. The LoadMGR continues to supply this output until the input voltage to the amplifier drops below a configurable level or until the ignition is turned off and the sleep timer expires.

In one example implementation, the InterClear circuit is internally current limited to one (1) amp. If an application requires higher currents, a power booster may be used. Also shown in FIG. 4 are the inputs 419, 420 from the microphone which are connected via the control head 700, including a radio re-broadcast (RRB) and/or microphone signal conditioning circuit 422. There is also a microphone controlled switch 424 which is connected to a digital potentiometer 426 and an amplifier circuit 428 to control volume. The digital potentiometer 426 is controlled by via the I²C port 434 to adjust the volume during PTT/PA (push-to-talk/public address) and RRB (radio re-broadcast) operation. During PTT/PA and RRB operation, an operator may adjust the volume setting and the adjusted setting is stored in memory. Thus, the amplifier microprocessor sub-module 500 (e.g., microprocessor 502) stores in memory the previous digital volume control setting during each of PTT/PA and RRB operation and sets the potentiometer 426 at the previous setting the next time PTT/PA or RRB operation is actuated by the operator. Also part of the related connections are a circuit 430 controlling a DC bias of the audio circuit and a voice input 432 (audio power is indicated as $V_{AP}$).

The module 400 includes several I/O ports 434 for communication including an I²C port for communicating with the light board module 600, an SAE J1708 port for communicating with the control head 700 and a programming port for communication with a USB port of a computer having software for programming the processor 502 of the amplifier module 400.

Figure 5:
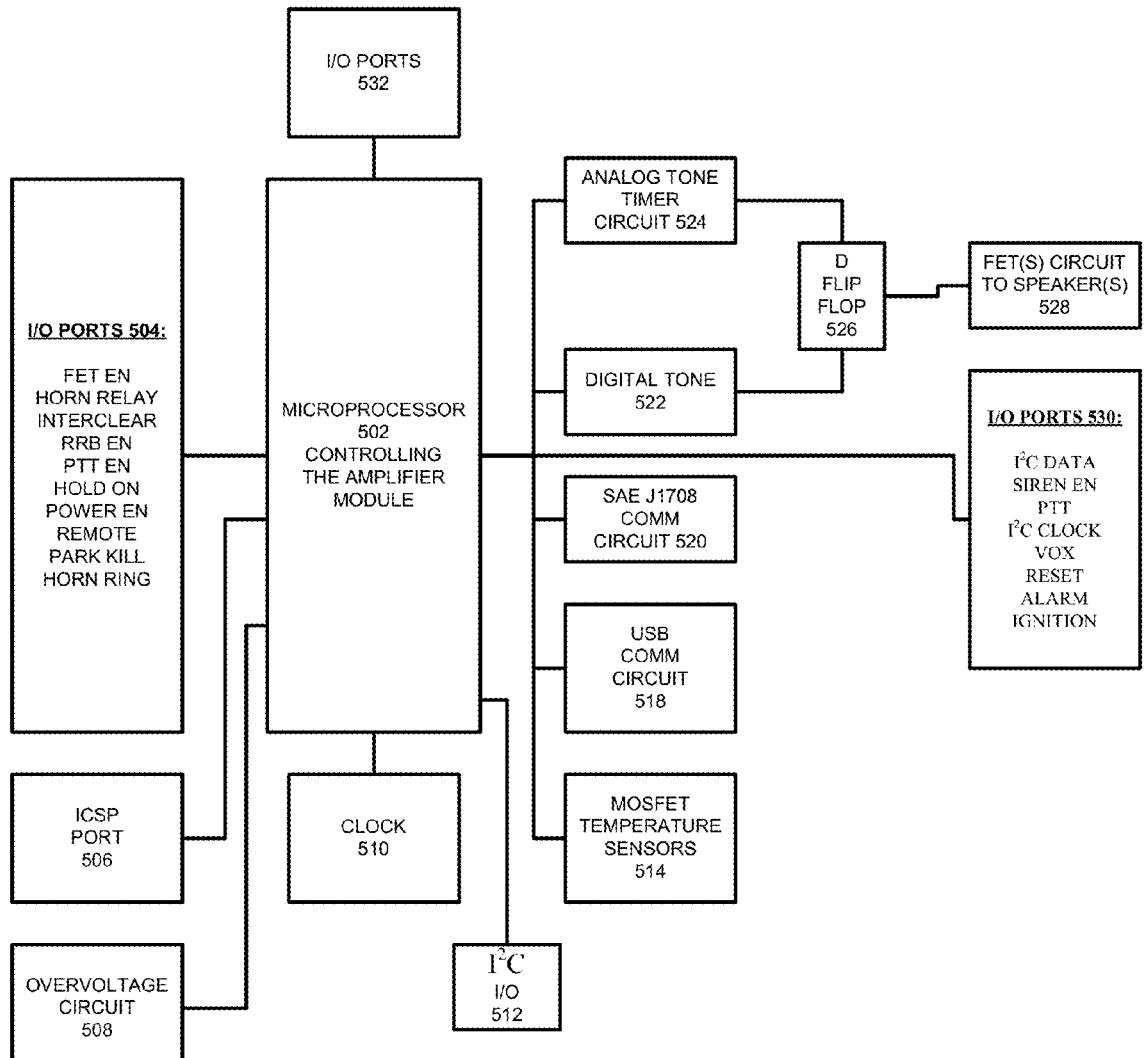
FIG. 5 is a block diagram of an example microprocessor sub-module for the example amplifier module.

FIG. 5 is a block diagram of an example microprocessor sub-module for the amplifier module 400. In this example, the microprocessor 502 for the amplifier module 400 is a PIC 16F887-E/PT processor although other processors may be used. Input/output (I/O) ports 504 include one or more of the following:

FET EN—to enable/disable siren output FETs 528 to the siren speakers;
HORN RELAY—to enable/disable the vehicle horn;
INTERCLEAR—to control InterClear feature output;
RRS EN—to enable/disable the RRB audio signal from going through the controlled switch 424;
PTT EN—to enable/disable the PA audio signal from going through the controlled switch 424;
HOLD ON—to hold power to the amplifier, the light board and the control head until the vehicle ignition is off and the sleep timer has expired;
POWER EN—to switch siren speaker output from full to reduced power out;
REMOTE—to monitor an external remote switch;
PARK KILL—to monitor the park switch; and
HORN RING—to monitor the status of the horn ring switch.

An ICSP port 506 is an in-circuit serial programming port for programming the microprocessor 502. The microprocessor is connected to an overvoltage circuit 508 for monitoring the applied voltage and selectively shutting down components or a system when the voltage exceeds a preprogrammed maximum, e.g. 15 volts. An external clock 510 may be connected to the microprocessor 502. An I²C I/O port 512 is connected to and communicates with a light board module processor 602. In order to prevent overheating, port 514 monitors temperature sensors positioned adjacent MOSFETs 528 driving the siren speakers 407. Communications port 518 is connected to a USB communication interface such as an MCP2200 for connecting to a USB port of an external computer (e.g., laptop or desktop) to program the processor 502 which controls the amplifier module 400. Port 520 connects to the control head 700 via an SAE J1708 circuit such as a DS36277 transceiver. Digital and analog tones to the siren speakers are provided by either an analog tone timer circuit 524 controlled by and responsive to the microprocessor 502, or by a digital tone signal 522 generated by the microprocessor 502, via a flip-flop 526 and a MOSFET circuit 528 driving the speaker(s).

Input/Outputs to/from the microprocessor 502 include an I²C data port for communicating with a light module processor 602, a SIREN EN port for enabling the short circuit current sense circuit to allow for tone generation by the siren, a PTT port for monitoring the push-to-talk switch on the microphone, a I²C CLOCK port for generating the clock pulses for I²C communications, a VOX port for monitoring voice, a RESET port that may be connected to ground for resetting the microprocessor 502 to factory default configuration, an ALARM port for sensing a user supplied monitor (such as a canine temperature sensor), and/or an IGNITION port for monitoring when the ignition is on or off).

In one example implementation, the system includes computer executable diagnostic instructions stored on a tangible computer readable media and executable by the amplifier module processor 502 for detecting one or more of the following system faults:

A configuration failure in which amplifier module 400 fails to successfully load configuration data at power up wherein in response to the configuration failure, the control head lights blink and a piezo buzzer sounds to visually and audibly signal an operator;

A communication failure in which the control head and amplifier module 400 are unable to establish data communications therebetween, wherein in response to the communication failure the control head signals the operator (e.g., visually and/or audibly) until communication is established; and A blown fuse or no output voltage wherein in response to the blown fuse or no output voltage the control head signals the operator (e.g., audibly or via a flashing light).

In one example implementation, the amplifier module processor 502 implements programmable multiple siren tone sets responsive to activation of the following on the control head:

A WAIL push-button so that the microprocessor 502 generates a wail tone via speakers 407 when the WAIL push-button is pressed;

A YELP push-button so that the microprocessor 502 generates a yelp tone via speakers 407 when the YELP push-button is pressed;

A ALT TONE push-button so that the microprocessor 502 generates the Hi-Lo tone via speakers 407 when the ALT TONE push-button is pressed; and A MANUAL push-button so that the microprocessor 502 generates a MANUAL wail tone via speakers 407 when the MANUAL push-button is pressed.

Usually, a PTT push-button is pressed on a microphone to activate the PTT function. In one example implementation, the amplifier module processor 502 resets the PTT function after a preset period (e.g., 30 seconds) of being held so that the reset returns to its previous condition even though the PTT push-button is still being held in the on position. This avoids the situation where the PTT push-button is "stuck" in the ON position for extended periods, such as beyond the preset period.

In one example implementation, computer executable instructions for providing a digital volume control are implemented by the amplifier module processor 502 including separate and independent volume control for radio re-broadcast (RRB) and public address (PA) transmissions of audio provided by a microphone connected to the control head. The microphone has a PTT (press-to-talk) push-button which is also responsive to a volume adjustment mode for digitally adjusting the potentiometer 426 to adjust the volume.

Optionally, the amplifier module processor 502 may execute computer instructions broadcasting two-way radio reception over the siren speakers 407 when a two-way radio is connected to an auxiliary port of the amplifier module 400.

In FIG. 5, the other inputs and outputs to the amplifier module 400 which are illustrated in FIG. 4 are directly or indirectly via circuits connected to the processor 502. These inputs and outputs are represented by I/O ports 532.

Figure 6:
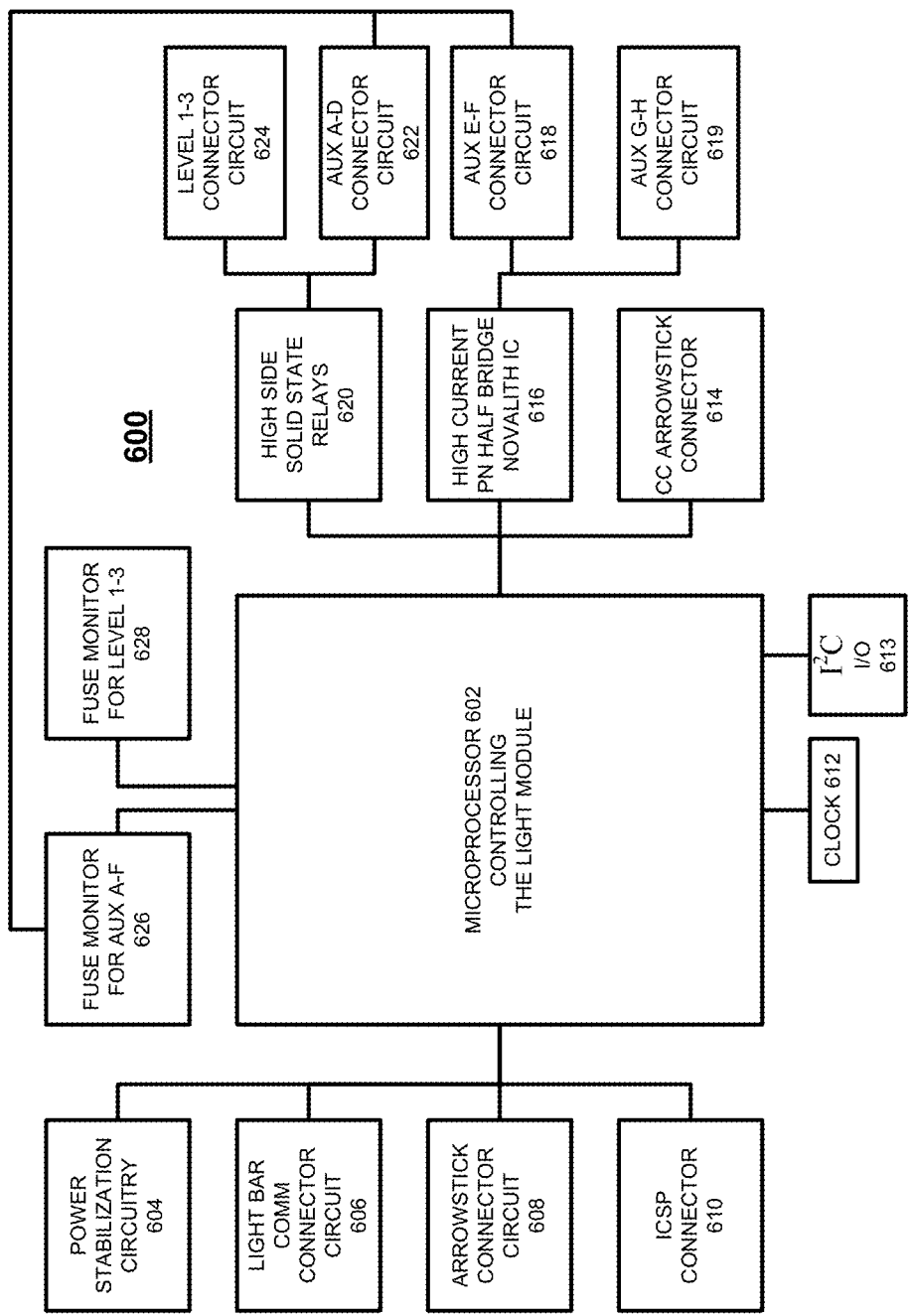
FIG. 6 is a block diagram of an example light module.

FIG. 6 is a block diagram of an example light module 600. In this example, the microprocessor 602 for an emergency warning light, such as a light bar, may be any processor having serial and parallel ports, such as a PIC 16F887-E/PT processor. The microprocessor 602 interfaces with power stabilization circuitry 604 for controlling the voltage applied to the light bar. A light bar parallel communication port 606 connects to a centrally controlled light bar (i.e., an emergency warning light), to control the light bar. An Arrowstik® traffic directing light communication parallel port 698 controls the traffic directing device. An ICSP port 610 permits in circuit serial programming (ICSP). An external clock 612 is connected to the processor 602. An I²C I/O port 613 is connected to and communicates with the amplifier processor via port 512. A CC Arrowstik connector 614 is for operating centrally controlled. Arrowstik® light products. An IC 616 is connected to the processor 602 to control the auxiliary circuits E-H 618, 619. Also, solid state relays 620 connect to the processor to control the level 1-3 connector circuit 624 and the auxiliary circuits A-D 622. Ports 626, 628 also monitor the auxiliary A-F fuses and the level 1-3 fuses, respectively.

Figure 7:
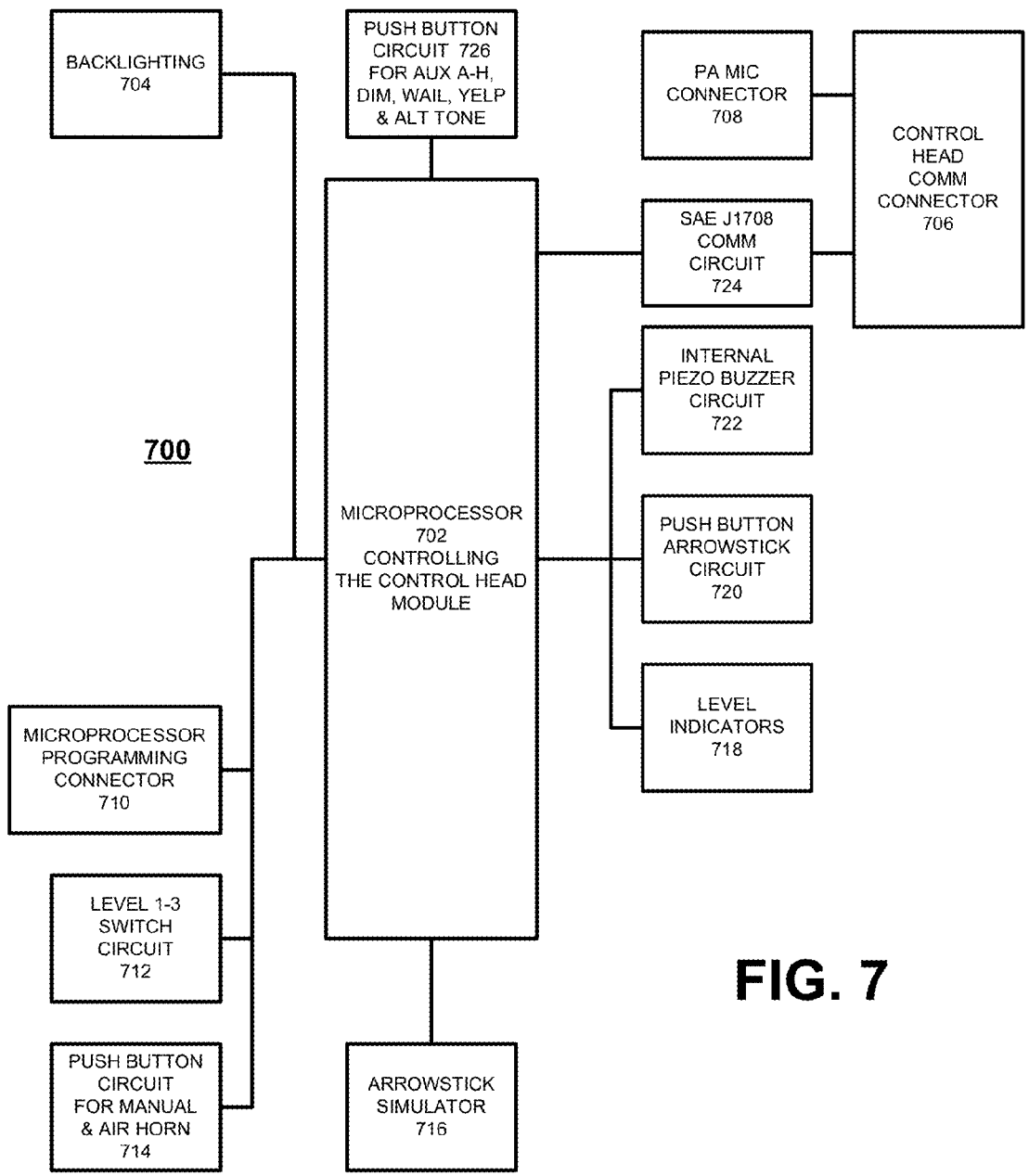
FIG. 7 is a block diagram of an example control head module.

FIG. 7 is a block diagram of an example control head module. In this example, the microprocessor 702 for the control head may be a PIC 16F887-E/PT processor. The microprocessor 702 interfaces with a backlighting circuit 704 to dim the LED lighting for the flash, left, center, right, manual and air horn push buttons on the control head (FIGS. 1A-1D, 2). A control head communication connector 706 connects to the SAE port of the amplifier microprocessor 502 via an SAE circuit 724 and to the PA microphone via connector 708. A connector 710 provides a programming input to the processor 702, which also connects level 1-3 switch circuit 712 (e.g., the red toggle switch) and the push buttons for manual siren and air horn operation 714. An Arrowstik simulator circuit 716 on the face of the control head is driven by the processor 702 to indicate that the traffic directing signal is illuminating a move right pattern, a move left pattern, a move left or right pattern or a flash pattern. Three LEDs indicating the position of the toggle switch and thus the level of operation are connected at 718. The button controls for the Arrowstik® light are connected at 720. An internal audio device (e.g., piezo buzzer or speaker) for the control head (e.g., to beep or sound alarms) is connected at 722. The push buttons for auxiliary A-H, dim, wail, yelp and alternative tone on the face of the control head 700 are connected at 726.

Optionally, the control head processor 702 may include a configurable light alert function in which an audible signal is generated on a periodic basis when any lighting is activated including auxiliary and traffic directing lighting.

In one example implementation, at least one of the processors is programmed to implement a configurable power manager function or a configurable load manager function. For example, at least one of the processors is programmed to implement monitoring voltages or currents of components and includes de-energizing a component having a monitored voltage or a monitored current outside a preset range. As another example, at least one of the processors is programmed to implement monitoring current or voltage of the power supply and includes dropout voltage groups wherein a user selects one or more groups of outputs of the system to de-energize when the power supply levels fall below a specified voltage level for each selected group. In one embodiment, the preset range and/or the specified voltage level are each configurable by the user via a USB port connected to one of the processors. Alternatively or in addition, a delay may be specified before a group is dropped out.

In one example implementation, at least one of the processors implements a user configurable input voltage monitoring and dropout function in which an input voltage from the power supply is monitored and one or more operations are disabled when the input voltage is outside a user configurable range.

In one example implementation, at least one of the processors includes a lock function selectable at configuration such that a remote input activates the lock function allowing only allow siren tones to be generated via the speakers when a signal (positive or negative as set in configuration) is applied to the remote input. This function meets certain requirements of the European Union.

In one example implementation, at least one of the processors includes a user configurable function which when activated by the user disables speaker Alt Tone functions and disables speaker Air Horn functions when any tone or light is active. This function meets certain requirements of California Title 13.

In one example implementation, at least one of the processors implements a load manager function and/or a configurable delayed shutoff function wherein the load manager when configured controls the power to other equipment in the vehicle through an external solenoid. The configurable delayed shutoff function when configured includes a sleep delay timer such that the system remains active after the vehicle ignition is turned off for the duration of the sleep delay timer.

The load manager function and/or the delayed shutoff function control the power supplied to other loads in the vehicle such that the power to these other loads are turned off when the user turns off the vehicle ignition and/or the voltage of the battery for the vehicle has dropped below a predetermined voltage level.

For purposes of illustration, programs and other executable program components, such as the operating system, are illustrated herein as discrete blocks. It is recognized, however, that such programs and components reside at various times in different storage components of the computer, and are executed by the data processor (s) of the computer.

Although described, in connection with an exemplary computing system environment, example implementations are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The example implementations may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Example implementations may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

Examples may be implemented with computer-executable instructions. The computer-executable instructions may be organized into one or more computer-executable components or modules on a tangible computer readable storage medium. Examples may be implemented with any number and organization of such components or modules. For example, Example implementations are not limited to the specific computer-executable instructions or the specific components or modules illustrated in the figures and described herein. Other example implementations may include different computer-executable instructions or components having more or less functionality than illustrated and described herein.

The order of execution or performance of the operations in examples illustrated and described herein is not essential, unless otherwise specified. That is, the operations may be performed in any order, unless otherwise specified, and example implementations may include additional or fewer operations than those disclosed herein. For example, it is contemplated that executing or performing a particular operation before, contemporaneously with, or after another operation is within the scope of the example implementations.

When introducing elements of example implementations, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some example implementations may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description enables one skilled in the art to make and use the invention, and describes several example implementations, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other example implementations and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX 1

Functions Controlled by Amplifier Module Processor

1. Receive data from Control Head via CAT5 cable.
2. Transmit data to Control Head via CAT5 cable.
3. Receive data from Light Board Head via internal cable.
4. Transmit data to Light Board via internal cable.
5. Receive configuration data from computer via USB connector.
6. Transmit configuration data to computer via USB connector.
7. Store all configuration settings for system in EEPROM.
8. Store Control Head Backlight Intensity in EEPROM.
9. Monitor DC Input voltage from vehicle.
10. Shut down Siren Tones if voltage above 15 VDC.
11. Shut down multiple outputs based on Load Manager configuration settings,
12. Monitor Vehicle Ignition to turn on and off the system.
13. Run Sleep Timer based on configuration settings.
14. Turn on or off LightAlert.
15. Generate all siren tones (Wail, Yelp, Hyper-Yelp 1, Hyper-Yelp 2, Hi-Lo 1, Hi-Lo 2, Hyper Hi-Lo 1, Hyper Hi-Lo 2, Air Horn 1, Air Horn 2, Manual Wail, Whoop, Alarm).
16. Monitor PTT switch for PA.
17. Turn on or off VOX for PA and RRB.
18. Turn on and off Audio circuits for running PA and RRB.
19. Store PTT/PA and RRB volume settings in EEPROM.
20. Set PTT/PA and RRB volume based on settings using by controlling a digital pot.
21. Turn on or off Current Sense for siren output short circuit protection.
22. Determine Auxiliary Button operation based on configuration settings (Toggle On/Off, Momentary, 8 s Delay, RRB, Hands-Free).
23. Determine 3-Level Switch operation based on configuration settings (Progressive, Independent, Semi-Progressive, User Defined).
24. Determine ArrowStik Button operation based on configuration settings.
25. Set Conventional ArrowStik Flash Patterns and Flash Rates based on configuration settings.
26. Monitor Alarm Input and sound Alarm when active.
27. Monitor Park Kill input, and control Siren Tones, 3-Level Switch And Auxiliary Buttons based on configuration settings.
28. Monitor Remote input and respond to signal based on configuration settings.
29. Monitor Horn Ring input and respond to signal based on configuration settings.
30. Control Horn Ring Transfer Relay.
31. Monitor FET temperature using separate Temperature sense devices during PA and RRB modes.
32. Shut down PA and RRB if temperature is too high.
33. Monitor Master Reset input and reset system to factory default configuration.

APPENDIX 2

Functions Controlled by Control Head Module Processor

1. Monitor 3-Level Switch position.
2. Monitor all Auxiliary Buttons to determine if operator presses a button.
3. Monitor all ArrowStik Buttons to determine if operator presses a button.
4. Monitor DIM Button to determine if operator presses button.
5. Monitor Wail, Yelp and Alt Tone Buttons to determine if operator presses a button.
6. Monitor Manual and Air Horn Buttons to determine if operator presses a button.
7. Transmit data to Amplifier via CAT5 cable.
8. Receive data from Amplifier via CAT5 cable.
9. Set Backlight Intensity based on settings stored in Amplifier processor.
10. Adjust Backlight Intensity and transmit value to Amplifier processor.
11. Adjust PTT/PA volume and transmit value to Amplifier processor.
12. Adjust RRB volume and transmit value to Amplifier processor.
13. Generate Flash Pattern and Flash Rate for ArrowStik indicator LEDs based on data received from Amplifier processor.
14. Control Auxiliary Button active LEDs based on data received from Amplifier processor.
15. Control Wail, Yelp and Alt Tone Button active LEDs based on data received from Amplifier processor.
16. Control DIM Button active LED based on data received from Amplifier processor.
17. Control 3-Level Switch LEDs based on data received from Amplifier processor.
18. Dim Arrowstik® light and 3-Level Switch LEDs when Dim mode is active.
19. Generate LightAlert beep when LightAlert is active.
20. Set LightAlert beep rate.
21. Generate Key Click beep whenever any button is pressed.
22. Blink 3-Level LED indicators based on fuse data received from Amplifier processor.
23. Blink Auxiliary LED indicators based on fuse data received from Amplifier processor.
24. Blink Level 3 LED indicator based on Park Kill data received from Amplifier processor.

APPENDIX 3

Functions Controlled by Light Module Processor

1. Receive data from Amplifier via internal cable.
2. Transmit data to Amplifier via internal cable.
3. Turn on and off Level 1, Level 2, Level 3A and Level 3B outputs based on data received from Amplifier processor.
4. Turn on and off all Auxiliary (A thru H) outputs based on data received from Amplifier processor.
5. Set Auxiliary G and H polarity (either can be a positive or negative output) based on data received from Amplifier processor.
6. Turn on and off Left, Right, Center and Flash outputs for controlling a central controlled Arrowstik® light.
7. Turn on and off Dim output.
8. Generate Flash Pattern and Flash Rate for conventional Arrowstik® light outputs.
9. Turn on and off conventional Arrowstik® light outputs.
10. Transmit RLS protocol data to Code 3® Serial Lightbar (RX2700CC and Defender® Serial Lightbars).
11. Monitor Level 1, Level 2, Level 3A and Level 3B output fuses.
12. Transmit Level 1, Level 2, Level 3A and Level 3B fuse state to Amplifier processor.
13. Monitor Auxiliary A thru F output fuses.
14. Transmit Auxiliary A thru F fuse state to Amplifier processor.

APPENDIX 4

Siren System Platform Z3 Technical Specification

Design and Feature Description

The siren control head has improved spill resistance.
The siren employs quick connect/disconnect technology to allow faster removal from vehicle.
The siren provides convenient/ easy access to the user-replaceable fuses.
The control head provides warning indication of blown fuses
The siren has the ability to connect to the existing serial light bar through an interface/data cable.
The siren has the ability to operate centrally-controlled light bars, as well as a Code 3® Arrowstik® lights.
The design platform uses flash programming for configuration where appropriate and/or feasible (instead of DIP switches or straps).
The siren can be configured by computer. The siren connects to the computer by USB cable. 12V must be applied to the siren during computer configuration.
The siren operating modes is configurable via software that runs on all versions of Microsoft Windows XP (Service Pack 3) through Windows 7 operating systems.
The siren configuration software provides "active acknowledgement" warnings (configuration personnel must click "OK" on warning message) to set configuration modes chat contradict either established standards or conventional operation.
The siren control head alerts the user of system faults by piezo buzzer beeps and/or LED flashes. The faults which can be indicated are:
  Configuration Failure (siren fails to successfully load configuration data at power up). Control head beeps and flashes all LEDs 5 times and then starts normal operation with Factory Default configuration.
  Communication Failure (control head and siren amplifier are unable to establish data communications). Control Head beeps and flashes all LEDs every 2 seconds until communication is established.
  Blown fuse or no output voltage for Levels 1, 2, 3A or 3B. 3-Level LEDs blinks rapidly to indicate that function is active, but no output voltage is being supplied.
  Blown fuse or no output voltage for Auxiliary outputs A through F. Auxiliary LEDs blinks rapidly to indicate that function is active, but no output voltage is being supplied.
The siren provides extensive Load Management functionality as described below:
The siren's under-voltage and over-voltage fault response is configurable as follows:
  The siren allows for 3 distinct function groups (Group 1, Group 2 and Group 3).

Each group's under-voltage fault threshold voltage can be individually set within the range of 10V to 12V in steps of 0.25V.

The functions to be contained in each group are selectable at configuration. The function choices are:

| | | |
|---|---|---|
| Level 1 | Auxiliary A | Auxiliary E |
| Level 2 | Auxiliary B | Auxiliary F |
| Level 3A | Auxiliary C | Auxiliary G |
| Level 3B | Auxiliary D | Auxiliary H |
| ArrowStik controls (selectable as a group) | | |
| LoadMGR (disables InterClear) | | |

Once selected, function assignments to group are unique. In other words, a function cannot be assigned simultaneously to more than one group.

When the siren supply voltage drops below a group's threshold voltage and stays for a preset amount of time (configurable between 1 to 5 minutes in 1 minute increments), the functions contained in that group cannot be activated.

The group's functions are disabled until power is cycled to the Ignition input (the system must be turned off and then turned back on again in order to reset the disabled functions).

LoadMGR uses the InterClear output when configured (disables InterClear feature) and can be used to control the power to other equipment in the vehicle through a customer provided high current solenoid. The LoadMGR also works with the Sleep Timer and remains active after the ignition is turned off for the duration of the Sleep Timer.

The siren tones auto-shutdown (no functionality) when over-voltage condition (15V or greater) is sensed. Normal operation resumes when the over-voltage condition is no longer sensed.

The siren has the capability to force a reset to default configuration. To minimize accidental activation, this capability is not be easily accessible.

The siren control head buttons' brightness is controlled by the LEFT and RIGHT arrow keys.

The siren is compatible with + or − switched vehicles for Park-Kill and Horn Ring inputs.

The siren provides a "stuck microphone" disable feature when in PA mode for greater than 30 seconds.

The siren has a configurable Park Kill functionality.

The design provides horn-ring and horn-ring scroll feature with scroll on/off.

The 3-Level switch output has L1, L2, L3A and L3B outputs. The user can configure which L3 output (if any) drops out with Park Kill.

Each of the 8 auxiliary outputs of the siren is rated as follows: A-D 4-5 A, E-H 4-10 A; 50 A total.

Each of the L1, L2 and L3 outputs is rated for 15 A, 50 A total.

The siren is designed for multiple tone sets, selectable during configuration.

The siren provides the standard basic tones and patterns (wail, yelp, hi-lo, air horn) as per applicable standards. Users will have to make special efforts to configure the product to perform in a non-standards compliant manner.

The siren is designed to accept an optional second amplifier to provide simultaneous dual tones (including low frequency signal). Therefore, simultaneous dual tone output require separate speakers for each amplifier (1 or 2 speakers per amplifier).

The siren has an EU Lock feature selectable at configuration. When selected the Remote input is used for this feature and all other functions of the Remote input is disabled. The EU Lock will only allow siren tones to be generated when a signal (positive or negative as set in configuration) is applied to the Remote input.

Each Level switch setting (Level 1, Level 2, Level 3) can be configured as follows:
Disabled
Siren activated
Horn Ring Transfer activated
ArrowStik switches activated (LEFT, CENTER, RIGHT, FLASH)
Auxiliary switches activated (AUX A, AUX B, AUX C, AUX D, AUX E, AUX F, AUX G, AUX H)

The WAIL and YELP switches can select from the following override tone choices:
Yelp (software override tones issues warning if primary are set to be identical).
Wail (software override tones issues warning if primary are set to be identical).
Hyper-Yelp 1
Hyper Yelp 2
Hi-Lo 1
Hi-Lo 2
Hyper-Lo 1
Hyper-Lo 2
Air Horn 1
Air Horn 2

The ALT TONE switch can be configured as follows (disabled automatically when CA T13 mode selected):
Wail
Yelp
Hyper-Yelp 1
Hyper-Yelp 2
Hi-Lo 1
Hi-Lo 2
Hyper-Lo 1
Hyper-Lo 2
Air Horn 1
Air Horn2

Override Tone choice (software issues warning if primary and override tones are set to be identical).
Wail
Yelp
Hyper-Yelp 1
Hyper-Yelp 2
Hi-Lo 1
Hi-Lo 2
Hyper-Lo 1
Hyper-Lo 2
Air Horn 1
Air Horn 2

The MANUAL switch can be configured as follows:
Enabled
Siren Active:
    None
    Hit & Go
    Scroll
    Manual Wail
    Whoop
Siren Inactive
    None
    Manual Wail
        NOTE: When MANUAL button is configured to Siren Inactive/Manual Wail mode, the following light switch control settings are available when the MANUAL button is pressed:
None—NOTE: The configuration software provides a warning when this setting is selected since it is not usually desired to have siren without warning lights.
Level 1 and/or Level 2 and/or Level 3A and/or Level 3B
Auxiliary A and/or Auxiliary B and/or Auxiliary C and/or Auxiliary D and/or Auxiliary E and/or Auxiliary F and/or Auxiliary G and/or Auxiliary H and/or
Whoop
NOTE: When MANUAL button is configured to Siren Inactive/Whcop mode, the following light switch control settings are available when the MANUAL button is pressed:
None—NOTE: The configuration software provides a warning when this setting is selected since it is not usually desired to have siren without warning lights.
Level 1 and/or Level 2 and/or Level 3
Auxiliary A and/or Auxiliary B and/or Auxiliary C and/or Auxiliary D and/or Auxiliary E and/or Auxiliary F and/or Auxiliary G and/or Auxiliary H
Hands-Free Scroll
None
Scroll
Manual Wail
Whoop
None—NOTE: The configuration software provides a warning when this setting is selected since it is not usually desired to have siren without warning lights.
Level 1 and/or Level 2 and/or Level 3
Auxiliary A and/or Auxiliary B and/or Auxiliary C and/or Auxiliary D and/or Auxiliary E and/or Auxiliary F and/or Auxiliary G and/or Auxiliary H
The AIR HORN switch can be configured as follows (disabled [siren active mode] when CA T13 mode is selected):
Enabled:
Always Enabled
Disabled when Siren active
Always Disabled
Air Horn 1
Air Horn 2
The Auxiliary A through F switches (center top six buttons) can be configured as follows:
Function
Toggle (On/Off)
Momentary
8 Seconds Delay
Radio Rebroadcast
Hands-Free Scroll
Disabled
Activate Auxiliary Switches: chose A through H
The Auxiliary G through H switches (center bottom two buttons) can be configured as follows:
Select Polarity (+12V or Ground)
Function
Toggle (On/Off)
Momentary
8 Seconds Delay
Radio Rebroadcast
Hands-Free Scroll
Disabled
Activate Auxiliary Switches: chose A through H
The LEFT, CENTER, and RIGHT ArrowStik control switches can be configured as follows:
Disabled
Pattern: Chose either Building, Building 3 Flash, Traveling Ball 3 Flash, Build/Collapse
Rate: Chose either Slow, Medium, Fast
The FLASH switch can be configured as follows:
Disabled
Pattern: Chose either Standard, Simultaneous, Even/Odd, Left/Right, Traveling Ball
Rate: Chose either Single Flash 75 FPM, Single Flash 110 FPM, Single Flash 220 FPM, Quad Flash
In addition, the following configurable features are provided:
3-Level Switch Configurations:
Progressive
Level 1—Level 1 Output
Level 2—Level 1 & Level 2 Outputs
Level 3—Level 1, Level 2, Level 3A & Level 3B Outputs
Independent
Level 1—Level 1 Output
Level 2—Level 2 Output
Level 3—Level 3A & Level 3B Outputs
Semi-Progressive
Level 1—Level 1 Output
Level 2—Level 2 Output
Level 3—Level 1, Level 2, Level 3A & Level 3B Outputs
User Defined Configurations:
Level 2 Configuration:
Level 2 Output
Level 1 & Level 2 Outputs
Level 3 Configuration:
Level 3 Output
Level 1, Level 3A & Level 3B Outputs
Level 2, Level 3A & Level 3B Outputs
Level 1, Level 2, Level 3A & Level 3B Outputs
Non CC ArrowStik Configurations (Applies to all ArrowStik Switches):
None
5 Head
End Flash Enable
6 Head
End Flash Enable
8 Head (NOTE: End Flash Not Available)
Enable PWM Dimming
Horn Ring
Enable
Enable with Horn Ring Transfer
Always Enabled
Polarity
Negative Activation
Positive Activation
Siren Active
Hit & Go
Scroll
Scroll On/Off
Manual Wail
Whoop
Air Horn 1
Air Horn 2
Siren Inactive
None
Manual Wail Whoop
    Air Horn 1
    Air Horn 2
Note: The Horn Ring always controls the Hands-Free Scroll when the feature is activated.
  Park Kill
    Polarity
      Negative Activation
      Positive Activation
    Siren Control
      Siren Stand By
    Level 3 Switch Control
      Level 3A Stand By
      Level 3B Stand By
    Auxiliary switch Control
      Auxiliary A No Impact
      Auxiliary A Off
      Auxiliary A Off while transmission in Park
      Auxiliary B No Impact
      Auxiliary B Off
      Auxiliary B Off while transmission in Park
      Auxiliary C No Impact
      Auxiliary C Off
      Auxiliary C Off while transmission in Park
      Auxiliary D No Impact
      Auxiliary D Off
      Auxiliary D Off while transmission in Park
      Auxiliary E No Impact
      Auxiliary E Off
      Auxiliary E Off while transmission in Park
      Auxiliary F No Impact
      Auxiliary F Off
      Auxiliary F Off while transmission in Park
      Auxiliary G No Impact
      Auxiliary G Off
      Auxiliary G Off while transmission in Park
      Auxiliary H No Impact
      Auxiliary H Off
      Auxiliary H Off while transmission in Park
  LightAlert
    3-Level Switch Enable/Disable
    Auxiliary Switches Enable/Disable
    ArrowStik Switches Enable/Disable
  Sleep Mode Time Out
    Instant
    10 minutes
    20 minutes
    30 Minutes
  CAT13 (Automatically disables Alt Tone and Disables the Air Horn if any Tone or Light is active)
    Enable/Disable
  Remote In
    Enable
      Enable with Horn Ring Transfer
      Always Enabled
    Polarity
      Negative Activation
      Positive Activation
    Siren Active
      Hit & Go
      Scroll
      Scroll On/Off
      Manual Wail
      Whoop
      Air Horn 1
      Air Horn 2
    Siren Inactive
      None
      Manual Wail
      Whoop
      Air Horn 1
      Air Horn 2
    Hands-Free Scroll
      None
      Scroll-On-Hold Off
      Manual Wail
      Whoop
      Air Horn 1
      Air Horn 2
    EU Lock
      Enable (disables Siren Active, Siren Inactive and Hands-Free features of Remote)

Operating Conditions:
Operating Voltage: 10-15 VDC (negative ground)
Operating Current:
  ~8 A when delivering 100 W into 11 Ohm load (13.6 VDC)
  ~18 A when delivering 200 W into 5.5 Ohm load (13.6 VDC)
Standby Current: 10 mA with backlighting
Amplifier Performance: 3 dB bandwidth 500 Hz to 3 KHz (minimum) relative to 1 KHz
Total Harmonic Distortion <10% (below clipping)

What is claimed is:

1. A system for controlling the use of an emergency warning light and a speaker on a vehicle with a power supply, said system comprising:
  an amplifier module having an amplifier module processor configured to control the amplifier module to selectively energize the emergency warning light and configured to drive the speaker, said amplifier module processor having a communications port;
  a light module having a light module processor configured to control the light module and the emergency warning light, said light module processor having a communications port;
  a communications link connecting the amplifier module communications port to the light module communications port;
  a control head connected to the amplifier module processor having a control head processor configured to control the amplifier module and configured to control the light module processor via the amplifier module processor and via the communications link;
  computer executable diagnostic instructions stored on a tangible computer readable media, said diagnostic instructions executable by the amplifier module processor configured to detect the following system faults:
    a configuration failure in which the amplifier module fails to successfully load configuration data at power UP wherein in response to said detected configuration failure, said amplifier module implements a factory default configuration; and
    a communication failure in which the control head and amplifier module are unable to establish data communications therebetween, wherein in response to said detected communication failure the control head signals the operator until communication is established.

2. The system of claim 1 further comprising said light module having at least one of: a serial port configured to control a serial emergency warning light and a parallel port configured to control a centrally controlled emergency warning light.

3. The system of claim 1 wherein the amplifier module processor is configurable and is configured to be modified via a USB port connected to the amplifier module processor.

4. The system of claim 3 further comprising computer executable user-configurable instructions stored on a tangible computer readable media, said configuration instructions executable by a computer to provide monitoring instructions to at least one of the processors via the USB port, said monitoring instructions when executed by at least one of the processors causing the system to detect a system setting relating to a light bar or siren which is outside a reference range, said monitoring instructions configured to cause the system to provide a warning to the user when a system setting is outside the reference range.

5. The system of claim 1, wherein said diagnostic instructions are executable by the amplifier module processor and are configured to detect the following system faults:
   a blown fuse or no output voltage wherein in response to said blown fuse or no output voltage the control head signals the operator.

6. The system of claim 5 wherein the diagnostic instructions include load management instructions which allow the system to receive under-voltage and over-voltage thresholds from an operator.

7. The system of claim 1 wherein the amplifier module processor is programmed to reset a push-to-talk (PTT) function after a configurable preset period of time elapses after a PTT push-button is continuously engaged to activate the PTT function for providing audio via a speaker to prevent the PTT function from remaining activated beyond the configurable preset period.

8. The system of claim 1 wherein the amplifier module processor is programmed to execute instructions configured to generate a siren tone responsive to digital control signals and responsive to the engagement of each of the following switches on the control head:
   A WAIL push-button wherein the amplifier module processor generates a wail tone via a siren speaker;
   A YELP push-button wherein the amplifier module processor generates a yelp tone via a siren speaker;
   A ALT TONE push-button wherein the amplifier module processor generates the Hi-Lo tone via a siren speaker; and
   A MANUAL push-button wherein the amplifier module processor generates a manual wail tone via a siren speaker.

9. The system of claim 1 further comprising instructions for execution by the amplifier module processor configured to provide digital volume control including separate and independent digital volume control for at least one of radio re-broadcast (RRB), push-to-talk (PTT) and public address (PA) transmissions of audio.

10. The system of claim 1 wherein the amplifier module processor is programmed to broadcast two-way radio reception over siren speakers when a two-way radio is connected to an auxiliary port of the amplifier module.

11. The system of claim 1 further comprising a light source for backlighting the control head wherein an intensity or brightness of the light source is adjustable wherein the control head processor is responsive to a user to selectively dim the light source.

12. The system of claim 1 further comprising solid state relays controlled by the amplifier module processor configured to selectively provide power to energize the emergency warning light and wherein the light module processor is connected to and controls the selective energizing of the emergency warning lights to create various configurable patterns in response to user input via the control head.

13. The system of claim 1 wherein the control head includes three control groups presented to an operator, a first control group configured to selectively control speaker operation, a second control group configured to selectively control auxiliary operations of the emergency warning light and the speakers and a third control group configured to selectively control a traffic directing light and the emergency warning light.

14. The system of claim 13 wherein the first control group includes a toggle switch and other switches having a faceplate colored red, wherein the second control group includes switches having a faceplate colored blue, and wherein the third control group has switches having a faceplate colored amber.

15. The system of claim 1 further comprising at least one of the following:
   wherein at least one of the processors is programmed to implement a configurable power manager function or a configurable load manager function;
   wherein at least one of the processors is programmed to implement monitoring voltages or currents of components and includes de-energizing a component having a monitored voltage or a monitored current outside a preset range; and
   wherein at least one of the processors is programmed to monitor a power supply voltage level and recognize dropout voltage groups selectable by a user and wherein in response to the monitored voltage level falling below a specified voltage level for a selected dropout voltage group, the processor is programmed to cause the selected dropout voltage group to become de-energized.

16. The system of claim 1 further comprising at least one of the following:
   at least one of the processors is programmed to implement monitoring voltages or currents of components of a light bar or a siren and includes de-energizing a component having a monitored voltage or a monitored current outside a preset range being selectable by a user via a USB port connected to one of the processors; and
   at least one of the processors is programmed to monitor a power supply voltage level and recognize dropout voltage groups selectable by a user and wherein in response to the monitored voltage level falling below a specified voltage level for a selected dropout voltage group, the at least one of the processors is programmed to cause the selected dropout voltage group to become de-energized, the specified voltage level being selectable by a user via a USB port connected to one of the processors and a delay period must elapse before the selected dropout voltage group is de-energized.

17. The system of claim 1 wherein the control head processor is programmed to implement a light alert function in which an audible signal is generated on a periodic basis in response to activation of a light controlled by the light module processor.

18. The system of claim 1 wherein at least one of the processors is programmed to implement a lock function selectable at configuration wherein a remote input activates the lock function allowing only preset siren tones to be generated via the speakers when a signal is applied to the remote input.

19. The system of claim 1 wherein at least one of the processors is programmed to implement a user configurable input voltage monitoring and dropout function in which an input voltage from the power supply is monitored and one or more operations are disabled when the input voltage is outside a user configurable range.

20. The system of claim 1 wherein at least one of the processors is programmed to implement a load manager function and a configurable delayed shutoff function wherein the load manager when activated controls the power to other equipment in the vehicle through an external solenoid and wherein the configurable delayed shutoff function when activated includes a sleep delay timer such that the system remains active after the vehicle ignition is turned off for the duration of the sleep delay timer.

21. The system of claim 20 wherein the load manager function and the delayed shutoff function control the power supplied to other loads in the vehicle such that the power to these other loads are turned off when the user turns off the vehicle ignition or the voltage of the battery for the vehicle has dropped below a predetermined voltage level.

22. The system of claim 1 wherein at least one of the processors is programmed to implement a user configurable function which when activated by the user disables speaker Alt Tone functions and disables speaker Air Horn functions when any tone or light is active.

23. The system of claim 1 wherein:
the power supply is connected to the amplifier module and the light module;
the emergency warning light is connected to the light module; and
the speaker is connected to the amplifier module.

24. A method for use with a power supply, an emergency warning light and a speaker, said method comprising:
providing an amplifier module having an input receiving power from the power supply and having outputs configured to selectively energize the emergency warning light and configured to selectively energize the speaker, said amplifier module having an amplifier module processor controlling the outputs of amplifier module, said amplifier module processor having a communications port;
providing a light module having an input receiving power from the power supply and having outputs configured to control the emergency warning light, said light module having a light module processor controlling the outputs of the light module, said light module processor having a communications port;
providing a communications link connecting the amplifier module communications port to the light module communications port;
controlling the amplifier module and controlling the light module processor via the amplifier module processor and via the communications link;
detecting a configuration failure in which the amplifier module fails to successfully load configuration data at power UP wherein in response to said detected configuration failure, said amplifier module implements a factory default configuration; and
detecting a communication failure in which the control head and amplifier module are unable to establish data communications therebetween, wherein in response to said detected communication failure the control head signals the operator until communication is established.

25. A system for controlling the use of an emergency warning light and a speaker on a vehicle with a power supply, said system comprising:

an amplifier module having an amplifier module processor configured to control the amplifier module to selectively energize the emergency warning light and to selectively energize the speaker, said amplifier module having a communications port;
a light module to selectively energize the emergency warning light, said light module having a communications port;
a communications link connecting the amplifier module communications port to the light module communications port;
a control head connected to the amplifier module configured to control the amplifier module and configured to control the light module via the amplifier module and via the communications link;
computer executable diagnostic instructions stored on a tangible computer readable media, said diagnostic instructions executable by the amplifier module processor configured to detect the following system faults:
a configuration failure in which amplifier module fails to successfully load configuration data at power UP wherein in response to said configuration failure, said amplifier module implements a factory default configuration; and
a communication failure in which the control head and amplifier module are unable to establish data communications therebetween, wherein in response to said communication failure the control head signals the operator until communication is established.

26. The system of claim 25 further comprising the following:
wherein at least one of the modules resets a push-to-talk (PTT) function after a preset period of time elapses after a PTT push-button is continuously engaged to activate the PTT function for providing audio via a speaker to prevent the PTT function from remaining activated beyond the preset period;
wherein at least one of the modules implements a configurable power manager function or a configurable load manager function;
wherein at least one of the modules monitors voltages or currents of components and includes de-energizing a component having a monitored voltage or a monitored current outside a preset range; and
wherein at least one of the modules monitors a power supply voltage level and recognize dropout voltage groups selectable by a user and wherein in response to the monitored voltage level falling below a specified voltage level for a selected dropout voltage group, the module causing the selected dropout voltage group to become de-energized; and
wherein at least one of the modules implements a load manager function and a configurable delayed shutoff function wherein the load manager when activated controls the power to other equipment in the vehicle through an external solenoid and wherein the configurable delayed shutoff function when activated includes a sleep delay timer such that the system remains active after the vehicle ignition is turned off for the duration of the sleep delay timer.

* * * * *